I. M. THURLOW.
VARIABLE SPEED DRIVE.
APPLICATION FILED JUNE 14, 1915.
1,216,749.
Patented Feb. 20, 1917.
2 SHEETS—SHEET 1.
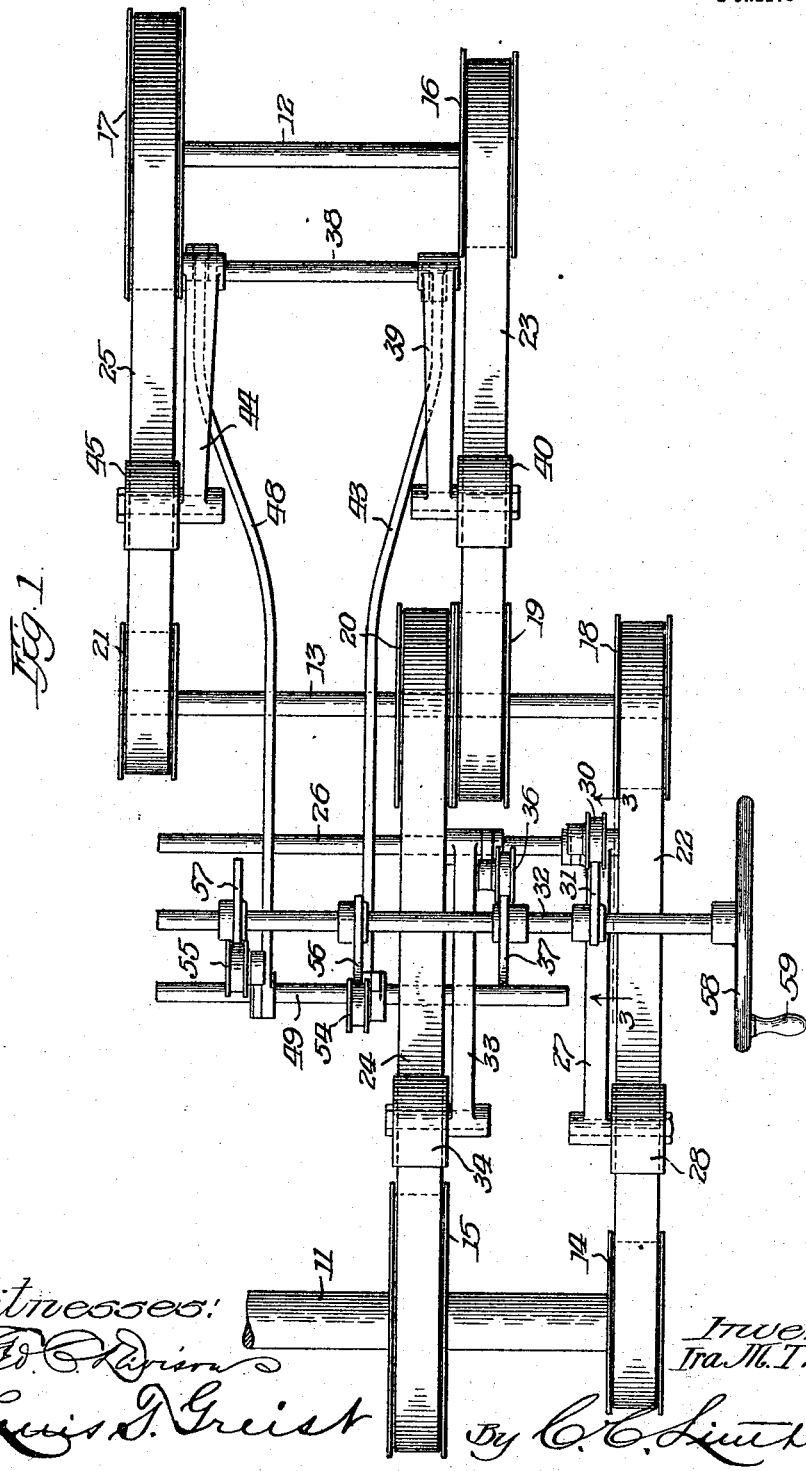

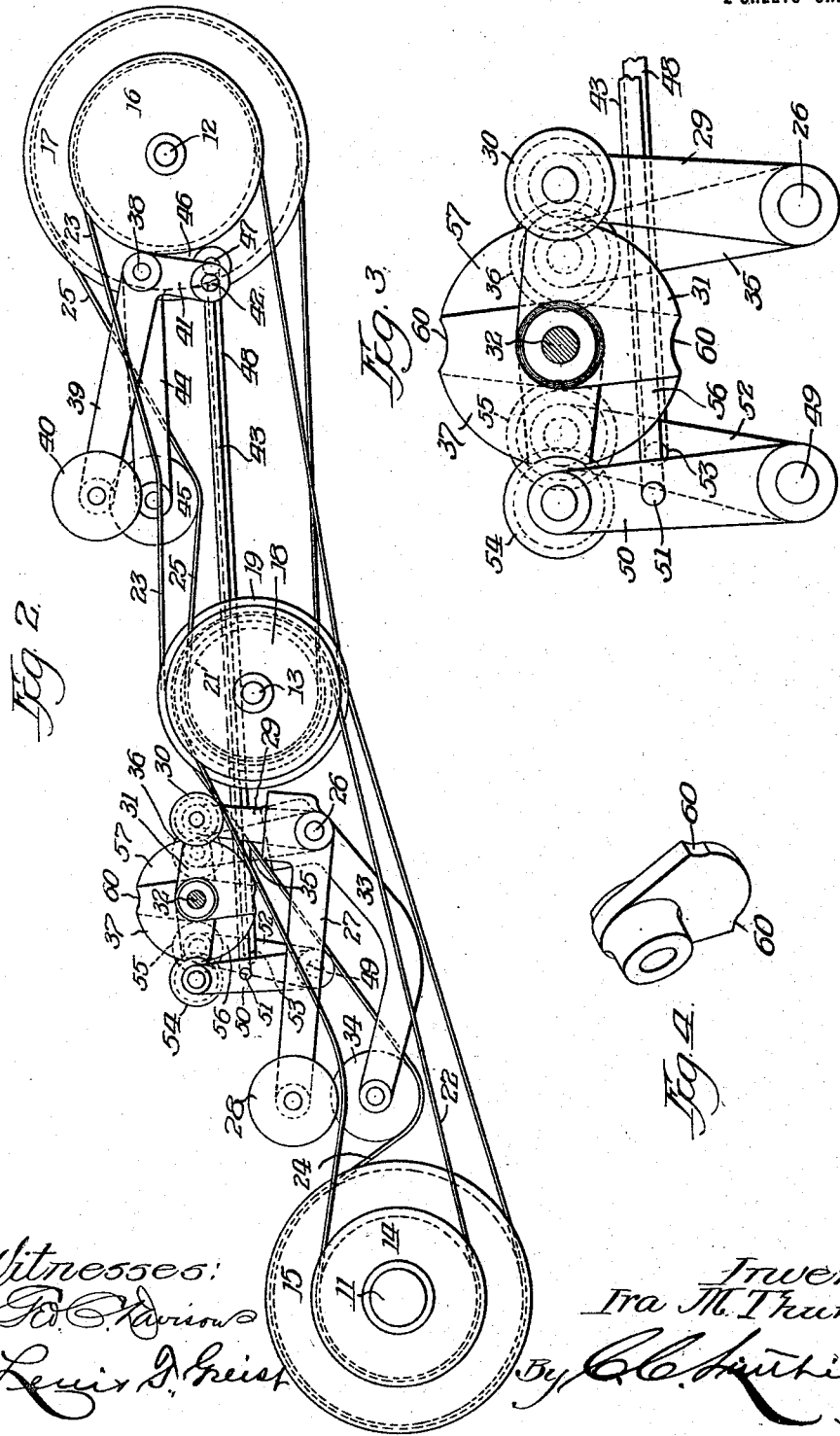

ID

UNITED STATES PATENT OFFICE.

IRA M. THURLOW, OF BELOIT, WISCONSIN, ASSIGNOR TO P. B. YATES MACHINE COMPANY, OF BELOIT, WISCONSIN, A CORPORATION OF WISCONSIN.

VARIABLE-SPEED DRIVE.

1,216,749.

Specification of Letters Patent.

Patented Feb. 20, 1917.

Application filed June 14, 1915. Serial No. 34,063.

*To all whom it may concern:*

Be it known that I, IRA M. THURLOW, a citizen of the United States, and resident of Beloit, in the county of Rock and State of Wisconsin, have invented certain new and useful Improvements in Variable-Speed Drives, of which the following is a specification.

The invention has for its object the provision of power transmission mechanism whereby to convey power at different speeds from a drive to a driven shaft, and also for instantly stopping and starting of the driven shaft without passing through the various speeds, all in a most simple and efficient manner.

In order that the invention may be readily understood, a perferred embodiment of the same is set forth in the accompanying drawings and in the description based thereon. As, however, the invention is susceptible of embodiment in other and varied constructional forms, the drawings and description are to be taken in an illustrative and not in an unnecessary limiting sense.

In the drawings—

Figure 1 is a plan view illustrating the relation of the several parts,

Fig. 2 is a side elevation of Fig. 1,

Fig. 3 is an enlarged sectional view on the line 3—3 of Fig. 1, and

Fig. 4 is a detailed perspective view of one of the cams.

Referring to the drawings more in detail, the drive shaft is illustrated at 11 and the driven shaft at 12, while intermediate the two shafts is located a countershaft 13. The drive shaft is shown as equipped with two belt pulleys 14 and 15, and the driven shaft as equipped with two belt pulleys 16 and 17. The countershaft is provided with four belt pulleys 18, 19, 20 and 21. It will be observed that the belt pulleys 14 and 16 are smaller in diameter than their companion pulleys 15 and 17; that the belt pulley 18 of the countershaft is of approximately the same diameter as the drive pulley 14 with which it is arranged in line for traverse by the belt 22. The two pulleys 19 and 20 upon the countershaft are arranged in line respectively with the pulleys 16 and 15, the two pulleys 19 and 20 being of similar diameter. The pulley 19 is of substantially the same diameter as the pulley 16 and is arranged in line therewith for traverse by the pulley 23, while the pulley 20 is arranged in line with the pulley 15 for traverse by the belt 24. The smallest pulley 21 of the countershaft 13 is in line with the largest pulley 17 of the driven shaft, these two pulleys being connected by means of the belt 25. The reference character 26 designates a rock shaft upon which are mounted two angle levers, one of which has a longer arm 27 carrying a belt tightener roll 28 and a shorter arm 29 carrying a cam roll 30 adapted to be engaged by the cam 31 mounted on the cam shaft 32. The second angle lever, mounted upon the shaft 26 carries by its longer arm 33 a belt tightener roll 34, while its shorter arm 35 carries a roll 36, arranged to be acted upon by the cam 37. The belt tighteners 28 and 34 are arranged to act respectively upon the belts 22 and 24 as clearly shown in Figs. 1 and 2.

At 38 is illustrated a rock shaft upon which are mounted two angle levers, the first of which has its longer arm 39 provided with a belt tightener 40 adapted to act upon the belt 23, while its shorter arm 41 has pivotally connected thereto at 42 an actuating link rod 43. The longer arm 44 of the second angle lever carries a belt tightener roll 45 arranged to act upon the belt 25. The shorter arm 46 of the last named angle lever has pivoted thereto at 47 an actuating link rod 48.

Reference character 49 designates a rock shaft upon which are mounted two arms, one of which, numbered 50, is pivoted at 51 to the end of the link rod 43, and the other arm 52 is pivoted at 53 to the end of the link rod 48. The two arms 50 and 52 carry respectively cam rolls 54 and 55 adapted to be actuated by the cams 56 and 57 respectively.

Upon the end of the cam shaft 32 is fixed a hand wheel 58 provided with a handle 59 by means of which the cam shaft may be angularly adjusted to bring the several cams into operative engagement with the cam rolls.

It will be observed that each of the cams 31, 37, 56 and 57 is formed as a sector or quadrant, four cams making up a complete circle and slightly overlapping at their edges. Each of the cams is cut away at its corners, as indicated at 60 in Fig. 4, the cut away portions of each cam coinciding with the cut away portions of adjacent cams so as to provide between adjacent cams a slight depression or recess, as shown in Figs. 2 and 3, these recesses serving to retain the rollers on the operative portions of the cams.

Assuming the cam shaft 32 to be so positioned by means of the hand wheel 58 that all of the cam rollers except 36 rest intermediate the depressions 60, all of the belt tighteners except 34 are held out of engagement with their belts by means of their respective cams and the cam roller 36 will be off its cam in the space of slightly less than 270° between the two approaches thereto. The countershaft 13 will now be running idly by transmission of power from the pulley 15 to the pulley 20.

A first speed is transmitted to the driven shaft 12 from the drive shaft 11 by turning the hand wheel through one-eighth revolution, whereby to bring the cam rollers 30 and 54 into opposite recesses 60, whereupon the cams 37 and 57 will be caused to disengage the cam rollers 36 and 55, which will drop entirely off the cams into the positions indicated in Figs. 2 and 3, thus permitting the belt tighteners 34 and 45 to drop into engagement with the belts 24 and 25, whereupon the motion of the shaft 11 is transmitted through the pulley 15, the belt 24 and the pulley 20 to the countershaft 13 and thence through the pulley 21, the belt 25 and the pulley 17 to the driven shaft 12.

A second speed is transmitted to the driven shaft 12 by turning the hand wheel 58 through another quarter revolution, whereupon the cam 37 again engages the cam roll 36, lifting the belt tightener 34 out of engagement with the belt 24, and the cam 31 releases the cam roll 30, permitting the belt tightener 28 to drop into engagement with the belt 22. As the belt tightener 45 remains in engagement with the belt 25, the movement of the shaft 11 is transmitted through the pulley 14, the belt 22 and the pulley 18 to the countershaft 13 and thence through the pulley 21, the belt 25 and the pulley 17 to the driven shaft 12.

The third speed of the driven shaft is obtained by turning the hand wheel 58 through another quarter revolution, whereby the cam roll 55 is engaged by the cam 57, lifting the belt tightener 45 from the belt 25, and at the same time the cam roll 54 is disengaged from the cam 56, permitting the belt tightener 40 to drop into engagement with the belt 23, and thereupon the shaft 12 is driven from the shaft 11 through the pulley 14, the belt 22, the pulley 18, the countershaft 13, the pulley 19, the belt 23 and the pulley 16.

A fourth speed is obtained by turning the hand wheel through another quarter revolution, whereby the cam roll 30 is engaged by the cam 31, lifting the belt tightener 28 out of engagement with the belt 22 while the belt tightener 40 remains in engagement with the belt 23, and the cam 37 disengages the cam roll 36 and permits the tightener 34 to drop into engagement with the belt 24. Thus the movement of the shaft 11 is transmitted through the pulley 15, the belt 24 and the pulley 20 to the countershaft 13 and thence through the pulley 19, the belt 23 and the pulley 16 to the shaft 12.

At each intermediate position between the quarter revolutions of the hand wheel 58 the several cams, with one exception, are brought into such position that their respective cam rolls will rest intermediate the recesses 60, and that one will drop entirely off its cam leaving its angle lever free to permit its belt tightener roll to drop into engagement with its belt.

If the active tightener be either 28 or 34, the countershaft 13 will be driven idly from the drive shaft 11, but if the active tighteners be either 40 or 45, both countershaft 13 and driven shaft 12 will obviously remain stationary for the lack of a driving connection with the drive shaft 11.

It follows that the motion of the driven shaft 12 may be stopped instantly by turning the hand wheel 58 to the nearest position intermediate the recesses 60 and without causing the driven shaft to pass through the various speeds. Likewise in starting it is only necessary to move the hand wheel from this neutral position intermediate the speeds in order to start the driven shaft at the same speed as before stopping.

Obviously the pulleys upon the drive shaft, the driven shaft and the countershafts may be rearranged as to position and size so as to obtain speeds of different ratio as may be suited to the work in hand, and also that the arrangement of the cams may be changed so as to effect different combinations of pulleys with resultant differences in speed, and the belt tighteners may be so arranged as to be lifted by their cams into engagement with the belts instead of dropping thereon by gravity.

I claim:

1. The combination with a drive shaft, a driven shaft, a countershaft, a plurality of pulleys of dissimilar size on each of the drive and driven shafts, pulleys of dissimilar size on the countershaft and equal in number to the aggregate number carried by the drive and driven shafts, and belts connecting the pulleys of the countershaft with those of the drive and driven shafts in pairs, of a tightener for each of the belts, and unitary means to bring any two of the tighteners into operation upon belts leading to and from the countershaft.

2. The combination with a drive shaft, a driven shaft, a countershaft, a plurality of pulleys of dissimilar size on each of the drive and driven shafts, pulleys of dissimilar size on the countershaft and equal in number to the aggregate number carried by the drive and driven shafts, and belts connecting the pulleys of the countershaft with those of the drive and driven shafts in pairs, of a tightener for each of the belts, and unitary means to render all the tighteners save one inactive and to bring any two of the tighteners into operation upon belts leading to and from the countershaft.

3. The combination with a drive shaft, a driven shaft, a countershaft, a plurality of pulleys of dissimilar size on each of the drive and driven shafts, pulleys of dissimilar size on the countershaft and equal in number to the aggregate number carried by the drive and driven shafts, and belts connecting the pulleys of the countershaft with those of the drive and driven shafts in pairs, of a tightener for each of the belts, another shaft and means carried by the latter shaft and arranged in different angular adjustments of the shaft to act on the belt tighteners to render effective any two of the belts leading to and from the countershaft.

4. The combination with a drive shaft, a driven shaft, a countershaft, a plurality of pulleys of dissimilar size on each of the drive and driven shafts, pulleys of dissimilar size on the countershaft and equal in number to the aggregate number carried by the drive and driven shafts, and belts connecting the pulleys of the countershaft with those of the drive and driven shafts in pairs, of a tightener for each of the belts, another shaft and cams carried by the latter shaft and arranged in different angular positions of the shaft to act on the belt tighteners to render effective any two of the belts leading to and from the countershaft.

5. The combination with a drive shaft, a driven shaft, a countershaft, a plurality of pulleys of dissimilar size on each of the drive and driven shafts, pulleys of dissimilar size on the countershaft and equal in number to the aggregate number carried by the drive and driven shafts, and belts connecting the pulleys of the countershaft with those of the drive and driven shafts in pairs, of a tightener for each of the belts, another shaft and cams carried by the latter shaft and arranged in different angular adjustments of the shaft to act on the belt tighteners to render effective any two of the belts leading to and from the countershaft, said cams arranged in intermediate adjusted positions of the cam shaft to render ineffective the belt connection between the drive and driven shafts.

Signed at Chicago, Illinois, this 10th day of June, 1915.

IRA M. THURLOW.

Witnesses:
LEWIS T. GREIST,
MILTON T. MILLER.

Copies of this patent may be obtained for five cents each, by addressing the "Commissioner of Patents, Washington, D. C."